(12) United States Patent
Enewoldsen et al.

(10) Patent No.: US 7,361,297 B2
(45) Date of Patent: Apr. 22, 2008

(54) PROCESS FOR MAKING A DECORATED LAMINATE

(75) Inventors: Patric Enewoldsen, Monheim (DE); Mathias Lauter, Dormagen (DE); Jürgen Hättig, Dormagen (DE); Roland Steenblock, Soltau (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/059,181

(22) Filed: Feb. 16, 2005

(65) Prior Publication Data

US 2005/0153111 A1 Jul. 14, 2005

Related U.S. Application Data

(62) Division of application No. 10/076,583, filed on Feb. 15, 2002, now abandoned.

(30) Foreign Application Priority Data

Feb. 20, 2001 (DE) ................................ 101 07 860

(51) Int. Cl.
*B29C 45/14* (2006.01)

(52) U.S. Cl. ...................... 264/511; 264/132; 264/135; 264/275

(58) Field of Classification Search ................ 264/132, 264/135, 250, 267, 275
See application file for complete search history.

(56) References Cited

U.S. PATENT DOCUMENTS

| 2,811,744 A | * | 11/1957 | Baldanza ..................... 264/153 |
| 4,707,396 A | | 11/1987 | Wank et al. ................. 428/216 |
| 5,437,755 A | | 8/1995 | Lavorel et al. ............. 156/240 |
| 5,658,647 A | | 8/1997 | Magill et al. ............... 428/195 |
| 6,623,677 B1 | * | 9/2003 | Smith et al. ................. 264/132 |

FOREIGN PATENT DOCUMENTS

JP 61-64483 4/1986

* cited by examiner

*Primary Examiner*—Edmund H. Lee
(74) *Attorney, Agent, or Firm*—Aron Preis

(57) ABSTRACT

A laminate comprising a printed layer, a transparent thermoplastic polyurethane layer and a layer forming a substrate of a thermoplastic material is disclosed. The laminate that is characterized in that the printed layer is interposed between the layer forming a substrate and the polyurethane layer is suitable for the preparation of a variety of articles.

5 Claims, No Drawings

PROCESS FOR MAKING A DECORATED LAMINATE

This application is a Divisional of U.S. Ser. No. 10/076,583 filed Feb. 15, 2002 now abandoned.

FIELD OF THE INVENTION

The present invention relates to a film laminate and more particularly to a laminate containing printed films.

SUMMARY OF THE INVENTION

A laminate comprising a printed layer, a transparent thermoplastic polyurethane layer and a layer forming a substrate of a thermoplastic material is disclosed. The laminate that is characterized in that the printed layer is interposed between the layer forming a substrate and the polyurethane layer is suitable for the preparation of a variety of articles.

BACKGROUND OF THE INVENTION

Back-sprayed laminates with a colored layer are in principle already known (see for example DE 44 24 106 A), as are high temperature-resistant printing inks (DE 198 32 570 A1 and DE 44 21 561 A1 and the publication by the Pröll company, Treuchtlinger Str. 29, 91781 Weißenburg published in November 1999 entitled "Einführung in die IMD-Technologie". The laminates according to DE 44 24 106 A1 have serious disadvantages however that are not mentioned in DE 44 24 106 A1, nor are any remedial methods and measures indicated there. The employed films that are mentioned there can expand only to a small extent and have to be thermoformed in a complicated intermediate step by vacuum or high pressure cold forming after preheating. This step leads to an unnecessary stress of the thermoplastic material and to a deterioration of the mechanical properties of the film. By using polycarbonate-based films the resultant product is softer and has a better feel, though parts having a high abrasion resistance cannot be obtained. The areas of application of decorated laminates are restricted. The polyurethane layers have to be applied from aqueous dispersion or from organic solvents, which is an unnecessary intermediate step according to the present invention since an intermediate layer serving as adhesive is not required. The thermoplastic material layers mentioned in DE 44 24 106 A1 have to be sprayed on at high temperatures (>260° C.), which in the case of the laminates according to the prior art necessitates the use of the aforementioned intermediate layer, since without the latter the colored layer would suffer from washing-out and distortion.

There is therefore a need to simplify significantly the production of decorated laminates and to open up further, hitherto inaccessible areas of application.

The laminates described in DE 44 24 106 A1 also have a high Shore hardness.

It has surprisingly been found that laminates based on films of thermoplastic polyurethanes with particularly low Shore hardnesses can be produced without any problem.

It has furthermore been found that a preforming step (thermoforming) is not necessary since on account of its extremely high expansibility the film can be adapted as required to any given geometrical shape.

It has moreover been found that, in contrast to the Pröll Company publication, the printing ink also adheres to thermoplastic TPU films.

DETAILED DESCRIPTION OF THE INVENTION

The present invention provides a composite based on printed films of transparent thermoplastic polyurethane and a substrate of thermoplastic material, in which the printed layer is arranged between the substrate and the polyurethane film.

Particularly preferably the laminates have a layer thickness of 0.2 mm to 20 mm, which leads to a substantial freedom as regards the forming and shaping of the substrates.

Preferably the printed layer comprises a high-temperature-resistant colored ink, for example the ink known from Offenlegungsschrift DE 198 32 570 A1.

The printed layer particularly preferably has a layer thickness of 3 to 50 μm.

Particularly preferably a colored layer whose softening point is from 160° C. to 200° C. is used as printed layer.

The high-temperature-resistant, flexible printing ink used for printing plastics materials consists in particular of pigment, binder and optionally conventional printing ink auxiliary substances, wherein the binder content accounts for at least 20 wt. %, referred to the total weight of the printing ink, and this binder for its part consists of 40 to 90 wt. % of a first binder component and 60 to 10 wt. % of a second binder component, in each case referred to the total weight of the binder, the first binder component being selected from a homopolycarbonate based on 4,4'-dihydroxydiphenyl-3,3,5-trimethyl-cyclohexane that substantially corresponds to the formula $[C_{22}H_{24}O_3]_n$ and that has a mean molecular weight of 20,000 to 40,000 and/or from a copolycarbonate based on 4,4'-dihydroxydiphenyl-isopropane and 4,4'-dihydroxydiphenyl-3,3,5-trimethylcyclohexane that substantially corresponds to the formula $[C_{22}H_{24}O_3]_n$—$[C_{16}H_{14}O_3]_m$ and that has a mean molecular weight of 30,000 to 50,000, wherein n denotes more than 50 mole % and less than 95 mole %, and m denotes more than 5 mole % and less than 50 mole % of the copolycarbonate, characterized in that the second binder component is a thermoplastic, linear, non-ionic, aliphatic or cycloaliphatic polyester polyurethane that can be obtained by reacting aliphatic or cycloaliphatic diisocyanates with an aliphatic polyester polyol having a mean molecular weight of 1,000 to 5,000, optionally in the presence of a chain extension agent, while maintaining an NCO/OH equivalent ratio of 0.9:1.0 to 1.0:1.1, and optionally in the presence of a catalyst, in an organic solvent that does not contain active hydrogen.

The thermoplastic material for the substrate of the laminate is in particular selected from the following: polyamide, polyester, polyolefin, styrene copolymer, polyphenylene oxide, polycarbonate, polyphenylene sulfide, polyvinyl chloride, polyurethane, PSO or PEEK, or mixtures of these polymers.

The substrate may also in particular comprise a thermoplastic material layer having a thickness of 0.1 mm to 19 mm, which for its part has a multilayer structure and/or is transparent.

The films of thermoplastic polyurethane (TPU) for the laminate are preferably those having a softening point (according to Kofler) of 140° C. to 180° C., preferably 155° C. to 170° C. The preferred TPU have a suitable melt viscosity in the temperature resistance range of the printing ink and may be back-sprayed without washing out the printing ink.

In particular the film has a hardness of 50 Shore A to 95 Shore A, preferably 65 Shore A to 90 Shore A. In this way the desired attractive appearance is imparted to the laminate.

The thickness of the TPU films is preferably at least 0.025 mm, more preferably 0.05 to 0.5 mm, and particularly preferably 0.08 to 0.3 mm. The preferred thickness provides for the necessary rapid dissipation of heat after the spraying on of the substrate. The particularly preferred thickness also enables higher melting point thermoplastics materials to be used.

In a preferred modification of the laminate a further intermediate layer of thermoplastic material is provided between the substrate and the printed layer, which is different from the material of the substrate and is in particular a thermoplastic polyurethane, preferably a transparent thermoplastic polyurethane, that acts as an insulating layer with respect to thermoplastic materials whose melting point is above the stability temperature of the printing ink.

In a special modification of the invention the thermoplastic material of the substrate is a transparent plastic material.

In certain applications it is particularly advantageous if the laminate is used in such a way that the substrate forms the cover layer with respect to the surroundings. The transparent substrate is particularly suitable for all externally visible applications (for example in the shoe industry).

Thermoplastic polyurethane elastomers (TPU) are technically important since they have excellent mechanical properties and can be thermoplastically processed inexpensively. Their mechanical properties can be varied over a large range by using different chemical starting components. Comprehensive details of TPU, their properties and uses are given in Kunststoff 68 (1978), pp. 819-825 and in Kautschuk, Gummi, Kunststoffe 35 (1982), pp. 568-584.

TPU are built up from linear polyols, generally polyester or polyether polyols, organic diisocyanates and short-chain diols (chain extenders). In order to accelerate the formation reaction catalysts may in addition be added. The molar ratios of the starting components may be varied over a wide range, and in this way the properties of the product can be adjusted. Molar ratios of polyols to chain extenders of 1:1 to 1:12 have proved suitable. In this way products are produced having hardness in the range from 70 Shore A to 75 Shore D. The synthesis of the thermoplastically processible polyurethane elastomers may be effected either stepwise (prepolymer process) or by the simultaneous reaction of all components in one stage (one-shot process). In the prepolymer process an isocyanate-containing prepolymer is formed from the polyol and the diisocyanate, which is then reacted in a second step with the chain extender. The TPU may be produced continuously or batchwise. The best known industrial production processes are the strip process and the extruder process.

Thermoplastically processible polyurethanes that may be used according to the invention can be obtained by reacting the following polyurethane-forming components A) organic diisocyanate, B) linear hydroxyl-terminated polyol with a molecular weight of 500 to 5000, C) diol or diamine chain extenders with a molecular weight of 60 to 500, the molar ratio of the NCO groups in A) to the groups in B) and C) that are reactive to isocyanate being 0.9 to 1.2.

As organic diisocyanates A) aliphatic, cycloaliphatic, araliphatic, heterocyclic and aromatic diisocyanates may be used for example, such as are described in Justus Liebigs Annalen der Chemie, 562, pp. 75-136.

In particular the following diisocyanates may be mentioned by way of example: aliphatic diisocyanates such as hexamethylene diisocyanate, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate as well as the corresponding isomer mixtures, 4,4'-dicyclohexylmethane diisocyanate, 2,4'-dicyclohexylmethane diisocyanate, and 2,2'-dicyclohexylmethane diisocyanate as well as the corresponding isomer mixtures, aromatic diisocyanates such as 2,4-toluylene diisocyanate, mixtures of 2,4-toluylene diisocyanate and 2,6-toluylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanatodiphenylethane-(1,2) and 1,5-naphthylene diisocyanate. There are preferably used 1,6-hexamethylene diisocyanate, isophorone diisocyanate, dicyclohexylmethane diisocyanate, diphenylmethane diisocyanate isomer mixtures with a 4,4'-diphenylmethane diisocyanate content of >96 wt. %, and in particular 4,4'-diphenylmethane diisocyanate and 1,5-naphthylene diisocyanate. The aforementioned diisocyanates may be used individually or in the form of mixtures with one another. They may also be used with up to 15 wt. % (calculated on the total amount of diisocyanate) of a polyisocyanate, for example triphenylmethane-4,4',4''-triisocyanate or polyphenylpolymethylene polyisocyanates.

As component B) linear hydroxyl-terminated polyols with a molecular weight of 500 to 5000 are used. Depending on the production conditions, these often contain small amounts of non-linear compounds. For this reason one frequently speaks of "substantially linear polyols". Preferred are polyester, polyether or polycarbonate diols or mixtures thereof.

Suitable polyether diols may be produced by reacting one or more alkylene oxides with 2 to 4 carbon atoms in the alkylene radical with a starter molecule containing two active hydrogen atoms in bound form. The following may be mentioned as examples of alkylene oxides: ethylene oxide, 1,2-propylene oxide, epichlorohydrin and 1,2-butylene oxide and 2,3-butylene oxide. Preferably ethylene oxide, propylene oxide and mixtures of 1,2-propylene oxide and ethylene oxide are used. The alkylene oxides may be used individually, alternating with one another, or as mixtures. Examples of suitable starter molecules include: water, aminoalcohols such as N-alkyldiethanolamines, for example N-methyl-diethanolamine, and diols such as ethylene glycol, 1,3-propylene glycol, 1,4-butanediol and 1,6-hexanediol. Optionally there may also be used mixtures of starter molecules. Suitable polyether diols are moreover the hydroxyl group-containing polymerisation products of tetrahydrofuran. Trifunctional polyethers may also be used in amounts of 0 to 30 wt. %, referred to the bifunctional polyethers, though at most in such an amount that a thermoplastically processible product is formed. The substantially linear polyether diols have molecular weights of 500 to 5000. They may be used individually as well as in the form of mixtures with one another.

Suitable polyester diols may be produced for example from dicarboxylic acids with 2 to 12 carbon atoms, preferably 4 to 6 carbon atoms and polyhydric alcohols. Examples of suitable dicarboxylic acids are: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used individually or as mixtures, for example in the form of a mixture of succinic, glutaric and adipic acids. For the production of the polyester diols it may possibly be advantageous to use, instead of the dicarboxylic acids, the corresponding dicarboxylic acid derivatives such as carboxylic acid diesters with 1 to 4 carbon atoms in the alcohol radical, carboxylic acid anhydrides or carboxylic acid chlorides. Examples of polyhydric alcohols are glycols with 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties the polyhydric alcohols may be used alone or optionally in the form of a mixture with one another. Also suitable are esters of carbonic acid with the aforementioned diols, in particular those with 4 to 6 carbon atoms, such as 1,4-butanediol or 1,6-hexanediol, or condensation products of hydroxycarboxylic acids, for example hydroxycaproic acid and polymerisation products of lactones, for example optionally substituted caprolactones. As polyester diols there are preferably used ethanediol polyadipate, 1,4-butanediol polyadipate, ethanediol-1,4-butanediol polyadipate, 1,6-hexanediol neopentyl glycol polyadipate, 1,6-hexanediol-1,4-butanediol polyadipate and polycaprolactones. The polyester diols have molecular weights of 500 to 5000 and may be used individually or in the form of mixtures with one another.

As chain extenders C) there are used diols or diamines with a molecular weight of 60 to 500, preferably aliphatic diols with 2 to 14 carbon atoms, such as for example ethanediol, 1,6-hexanediol, diethylene glycol, dipropylene glycol and in particular 1,4-butanediol. Also suitable however are diesters of terephthalic acid with glycols having 2 to 4 carbon atoms, such as for example terephthalic acid bis-ethylene glycol or terephthalic acid bis-1,4-butanediol, hydroxyalkylene ethers of hydroquinone, such as for example 1,4-di(hydroxyethyl)hydroquinone, ethoxylated bisphenols, (cyclo)aliphatic diamines such as for example isophorone diamine, ethylenediamine, 1,2-propylenediamine, 1,3-propylenediamine, N-methylpropylene-1,3-diamine, N,N'-dimethylethylenediamine, and aromatic diamines such as for example 2,4-toluylenediamine and 2,6-toluylenediamine, 3,5-diethyl-2,4-toluylene-diamine and 3,5-diethyl-2,6-toluylenediamine, and primary mono-, di-, tri- or tetraalkyl-substituted 4,4'-diaminodiphenyl-methanes. Mixtures of the aforementioned chain extenders may also be used. In addition relatively small amounts of triols may also be added.

Furthermore small amounts of conventional monofunctional compounds may also be employed, for example as chain extenders or mold release agents. Examples that may be mentioned include alcohols such as octanol and stearyl alcohol, or amines such as butylamine and stearylamine.

For the production of the TPU the starting components may be reacted with one another, optionally in the presence of catalysts, auxiliary substances and additives, in such amounts that the equivalence ratio of NCO groups to the sum of the NCO-reactive groups, in particular the OH groups of the low molecular weight diols/triols and polyols, amounts to 0.9:1.0 to 1.2:1.0, preferably 0.95:1.0 to 1.10:1.0.

Suitable catalysts according to the invention are the known and conventionally used tertiary amines according to the prior art, such as for example triethylamine, dimethylcyclohexylamine, N-methylmorpholine, N,N'-dimethylpiperazine, 2-(dimethylaminoethoxy)ethanol, diazabicyclo-(2,2,2)-octane and similar compounds as well as, in particular, organometallic compounds such as titanic acid esters, iron compounds, tin compounds, for example tin diacetate, tin dioctoate, tin dilaurate or the tin dialkyl salts of aliphatic carboxylic acids such as dibutyltin diacetate, dibutyltin dilaurate or the like. Preferred catalysts are organometallic compounds, in particular titanic acid esters, iron compounds or tin compounds.

In addition to the TPU components and the catalysts, there may also be added other auxiliary agents and additives. By way of example there may be mentioned lubricants such as fatty acid esters, their metal soaps, fatty acid amides and silicone compounds, anti-blocking agents, inhibitors, stabilisers against hydrolysis, light, heat and discolouration, flame-proofing agents, colourants, pigments, inorganic or organic fillers and reinforcing agents. Reinforcing agents are in particular fibre-like reinforcing substances such as inorganic fibres that are produced according to the prior art and may also be mixed with a sizing material. Further details of the aforementioned auxiliary substances and additives may be obtained from the specialist literature, for example J. H. Saunders, K. C. Frisch: "High Polymers", Vol. XVI, Polyurethanes, Parts 1 and 2, Interscience Publishers 1962/1964, R. Gächter, H. Müller (Eds.): Taschenbuch der Kunststoff-Additive, $3^{rd}$ Edition, Hanser Verlag, Munich 1989, or DE-A 29 01 774.

Further additives that may be incorporated into the TPU include thermoplastics, for example polycarbonates and acrylonitrile-butadiene-styrene terpolymers, in particular ABS. Other elastomers such as rubber, ethylene-vinyl acetate copolymers, styrene-butadiene copolymers as well as other TPU may also be used. Commercially available plasticizers such as phosphates, phthalates, adipates, sebacates and alkylsulfonic acid esters are also suitable for incorporation.

The TPU that may be used according to the invention may be produced continuously in a so-called extruder process, for example in a multi-shaft extruder. The metering of the TPU components A), B) and C) may take place simultaneously, i.e. in a one-shot process, or successively, i.e. according to a prepolymer process. In this connection the prepolymer may be added batchwise, or may also be produced continuously in one part of the extruder or in a separate upstream prepolymer unit.

The films that may be used according to the invention may be produced for example according to the processes known from the publications DE 25 17 033 A1 and DE 25 31 240 A1.

The laminate may be used in a very wide range of industrial applications in which importance is placed at the same time on protecting a printed decoration and on the special feel (specialist term: haptics) of the cover layer.

The present invention also provides for the use of the laminate according to the invention for the production of shoes, in particular sports shoes, wristwatch straps, housings for electrical goods, in particular mobile phones, domestic appliances, audio and video equipment, toys, tools and screens, in particular heating and ventilation screens in vehicles, as well as animal identification markers.

EXAMPLES

Example 1

A high-temperature resistant printing ink was applied by a screen-printing process to a transparent film of thermoplastic polyurethane 0.15 mm thick having a hardness of 80 Shore A and a softening temperature (according to Kofler) of 170° C. The film was laid in the injection mold by means of a vacuum in such a way that the printing ink faced the nozzle. The injection mold is thermostatically controlled at a temperature of 25-35° C. The thermostatic control device must have a line to enable the thermal energy of the injected melt of thermoplastic polyurethane to be dissipated so as to achieve a temperature drop of at least 170 K/min. The thermoplastic polyurethane was injected at a bulk temperature of 226° C. The injection rate is 30 mm/sec. For this experiment a sprue system is used in which the diameter at the start of the sprue channel is 2 mm. The diameter at the end of the conical sprue channel is 4 mm. The test bodies are produced in a cycle time of 60 secs. Laminates according to the invention are obtained.

Example 2

Example 1 is repeated, except that instead of a polyurethane an acrylonitrile-butadiene-styrene copolymer/polycarbonate blend with a bulk temperature of 260° C. is used for the back-spraying. Washing-out is encountered in the region of the sprue (=largest temperature difference).

Example 3

Example 1 is repeated, except that instead of a polyurethane a polycarbonate with a bulk temperature of 290° C. is used for the back-spraying. The printed film is deeply washed out.

Example 4

Example 2 is repeated. For this experiment a sprue system is used in which the diameter of 2 mm at the start of the sprue channel is increased to 3.5 mm. The diameter at the end of the conical sprue channel is increased from 4 mm to 5.5 mm. By reducing the friction-induced temperature rise of the melt from 29° C. to a temperature difference of 12° C. and reducing the maximum shear load from 11,000 l/sec. to ca. 6,100 l/sec., laminates according to the invention can also be obtained with a thermoplastic material whose processing (=melt) temperature lies above the stability temperature of the printing ink.

Example 5

Example 3 is repeated. The sprue system used in Example 4 is employed. At the same time a special polycarbonate is chosen (e.g. Makrolon 2405 from Bayer AG) whose processing temperature of 270° C. is substantially lower than the processing temperature of other polycarbonates. This combination of features enables laminates according to the invention to be produced.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for making a laminate comprising (i) applying a printed layer that contains a high temperature-resistant colored ink to a transparent thermoplastic polyurethane layer having a softening temperature (according to Kofler) of 140 to 180° C., a Shore A hardness of 50 to 95, and a thickness of at least 0.025 mm to produce a printed film and (ii) placing the printed film in a mold of an injection molding machine equipped with a nozzle, the printed layer facing the nozzle and (iii) injecting into the mold a thermoplastic material to form a substrate, the process being characterized in that the printed film is not preformed.

2. The process of claim 1 wherein the thermoplastic material is at least one member selected from the group consisting of polyamide, polyester, polyolefin, styrene copolymer, polyphenylene oxide, polycarbonate, polyphenylene sulfide, polyvinyl chloride, polyurethane, PSO and PEEK.

3. The process of claim 1 wherein the placing of the printed film is by means a vacuum.

4. The process according to claim 1 wherein the printed layer has a thickness of 3 to 50 μm.

5. The process according to claim 1 wherein the thermoplastic material is transparent.

* * * * *